(12) United States Patent
McMahon et al.

(10) Patent No.: US 11,187,092 B2
(45) Date of Patent: Nov. 30, 2021

(54) VANE FORWARD RAIL FOR GAS TURBINE ENGINE ASSEMBLY

(71) Applicant: United Technologies Corporation, Farmington, CT (US)

(72) Inventors: Shawn M. McMahon, West Hartford, CT (US); Nicholas J. Madonna, North Haven, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 218 days.

(21) Appl. No.: 16/415,007

(22) Filed: May 17, 2019

(65) Prior Publication Data

US 2020/0362711 A1 Nov. 19, 2020

(51) Int. Cl.
*F01D 9/04* (2006.01)

(52) U.S. Cl.
CPC ...... *F01D 9/041* (2013.01); *F05D 2220/3213* (2013.01); *F05D 2240/12* (2013.01); *F05D 2240/81* (2013.01)

(58) Field of Classification Search
CPC ... F01D 5/225; F01D 9/02; F01D 9/04; F01D 9/041; F01D 11/001; F01D 25/12; F05D 2220/3213; F05D 2240/12; F05D 2240/81
See application file for complete search history.

(56) References Cited

U.S. PATENT DOCUMENTS

| 5,394,687 | A | * | 3/1995 | Chen | F02C 7/08 60/785 |
| 6,969,233 | B2 | * | 11/2005 | Powis | B22C 21/14 415/191 |
| 9,021,816 | B2 | | 5/2015 | Bergman et al. | |
| 9,151,164 | B2 | * | 10/2015 | Tardif | F01D 5/187 |
| 9,222,364 | B2 | * | 12/2015 | Papple | F01D 5/187 |
| 9,238,969 | B2 | * | 1/2016 | Batt | F01D 9/041 |
| 10,385,727 | B2 | * | 8/2019 | Dutta | F01D 25/12 |
| 2014/0047843 | A1 | * | 2/2014 | Papple | F01D 9/041 60/726 |
| 2016/0084109 | A1 | * | 3/2016 | Pula | F01D 25/12 60/39.83 |

(Continued)

FOREIGN PATENT DOCUMENTS

| EP | 3323612 A1 | 5/2018 |
| EP | 3392462 A1 | 10/2018 |
| WO | 20141433301 A1 | 9/2014 |

OTHER PUBLICATIONS

EP Search Report for Application No. 20174860.5; dated Jan. 29, 2021.

*Primary Examiner* — Courtney D Heinle
*Assistant Examiner* — Sang K Kim
(74) *Attorney, Agent, or Firm* — Cantor Colburn LLP

(57) ABSTRACT

A vane for a gas turbine engine, the vane having: an airfoil; and a root portion disposed on a side of the airfoil and including a platform, the platform having a vane forward rail and an extension extending from the platform, the extension defining portions of an outer diameter platform cavity and an airfoil leading edge cavity. The extension extends from the platform such that an upper portion of each of the outer diameter platform cavity and the airfoil leading edge cavity is spaced equidistant from the platform.

19 Claims, 6 Drawing Sheets

(56) References Cited

U.S. PATENT DOCUMENTS

| | | | |
|---|---|---|---|
| 2017/0234154 A1* | 8/2017 | Downs | F01D 9/065 |
| | | | 415/177 |
| 2019/0032499 A1* | 1/2019 | Matsuo | F01D 5/081 |
| 2019/0368378 A1* | 12/2019 | VanTassel | F01D 11/005 |
| 2020/0190991 A1* | 6/2020 | Propheter-Hinckley | ............ |
| | | | F01D 5/187 |

* cited by examiner

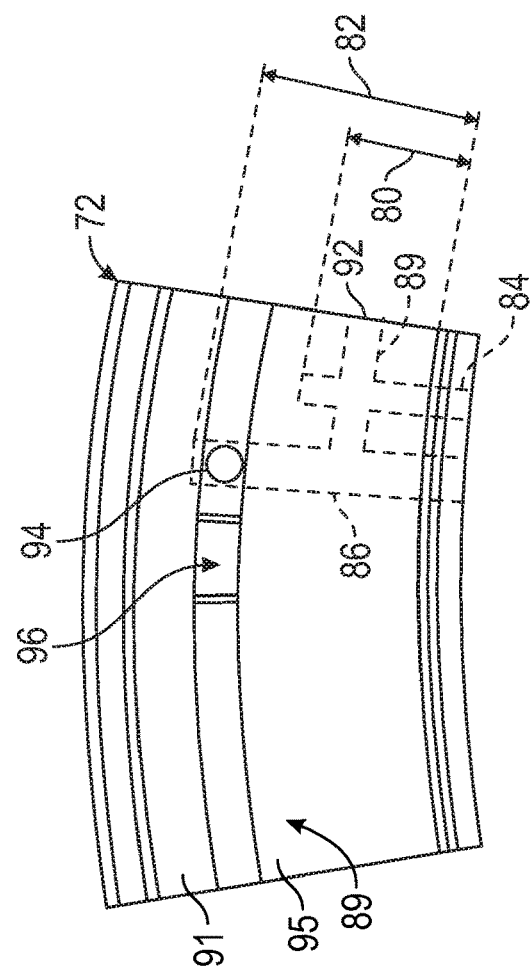
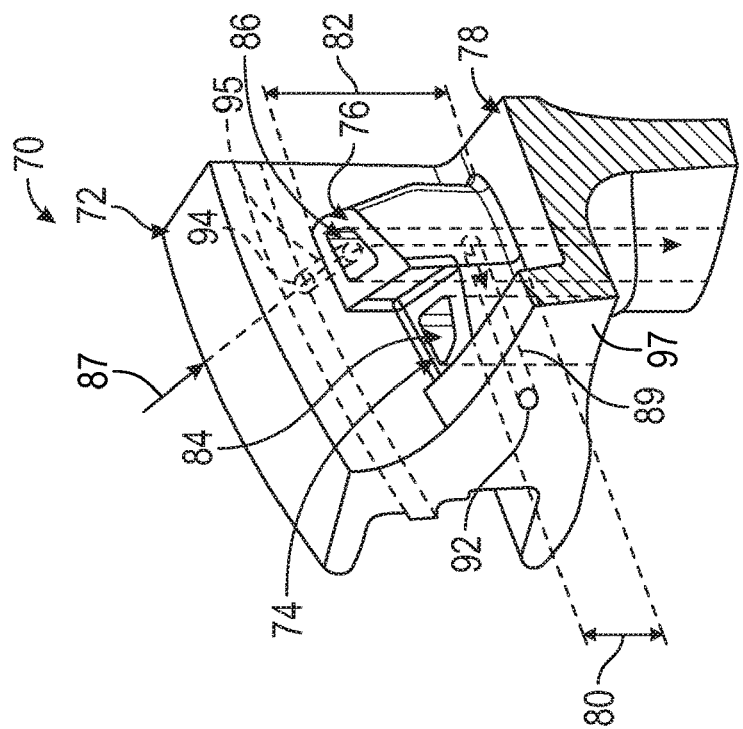

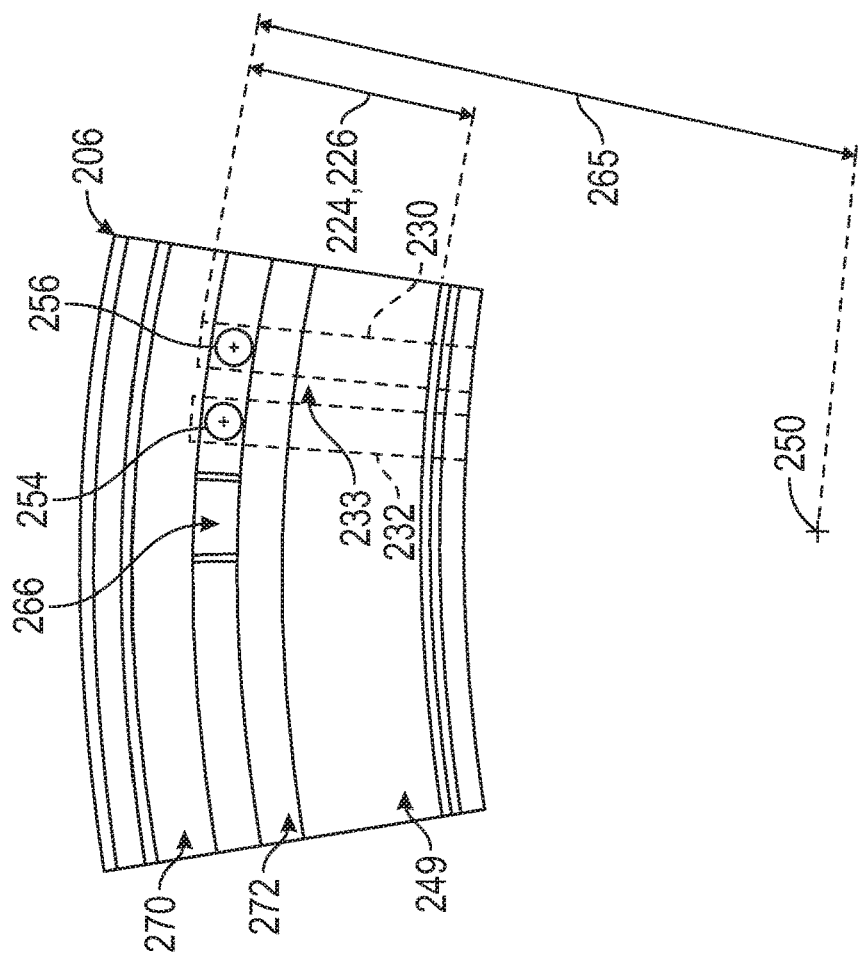
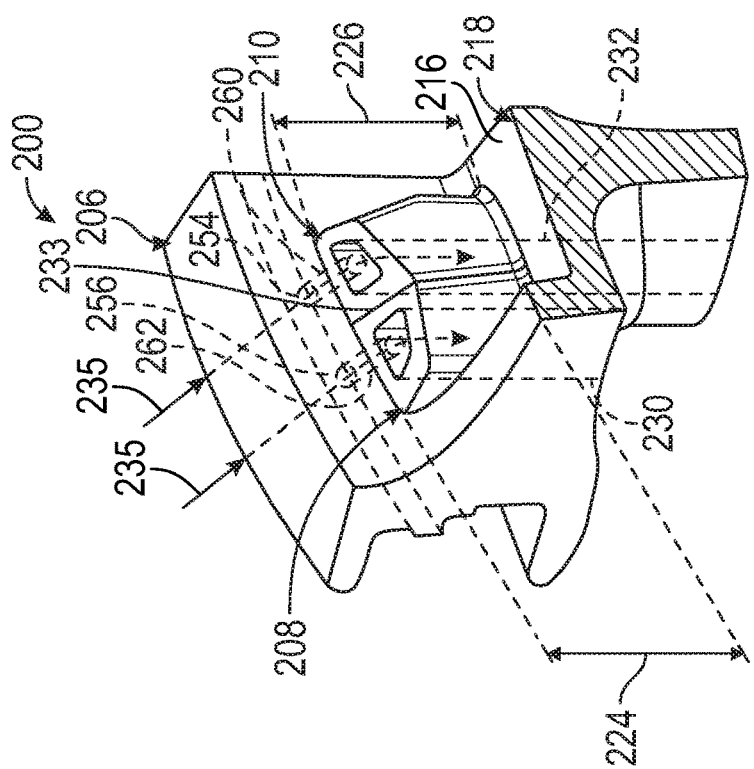
FIG. 4A
FIG. 4B

VANE FORWARD RAIL FOR GAS TURBINE ENGINE ASSEMBLY

BACKGROUND

Example embodiments of the present disclosure pertain to the art of gas turbine engine assemblies. A gas turbine engine assembly may include one or more vane assemblies, each vane in a respective vane assembly having one or more vane rails. An amount of air flow available to cores or cavities accessible via the vane rail varies based on size, shape, and location of the cores or cavities. Airflow access to the cores or cavities is typically provided through drilled channels. Current designs of cores and cavities are configured such that access to vain rail portions to drill to the cores or cavities is difficult and does not necessarily promote efficient air flow.

BRIEF DESCRIPTION

Disclosed is a vane for a gas turbine engine, the vane having: an airfoil; and a root portion disposed on a side of the airfoil and including a platform, the platform having a vane forward rail and an extension extending from the platform, the extension defining portions of an outer diameter platform cavity and an airfoil leading edge cavity, the extension extending from the platform such that an upper portion of each of the outer diameter platform cavity and the airfoil leading edge cavity is spaced equidistant from the platform.

In addition to one or more of the features described above, or as an alternative to any of the foregoing embodiments, the vane forward rail defines a first channel fluidly connecting a core air flow path and the outer diameter platform cavity to provide air to assist in managing thermal conditions of the vane forward rail.

In addition to one or more of the features described above, or as an alternative to any of the foregoing embodiments, the vane further includes a second channel defined by the vane forward rail, the second channel fluidly connecting the core air flow path and the airfoil leading edge cavity, the vane forward rail further defining a first inlet open to the first channel and a second inlet open to the second channel, the first inlet and the second inlet being spaced equidistant from a central axis.

In addition to one or more of the features described above, or as an alternative to any of the foregoing embodiments, the extension further defines a central wall disposed between the outer diameter platform cavity and the airfoil leading edge cavity.

In addition to one or more of the features described above, or as an alternative to any of the foregoing embodiments, the vane forward rail further defines a first inlet and a first channel having a first central axis for fluidly connecting a core air flow path and the outer diameter platform cavity, the vane forward rail further defining a second inlet and a second channel having a second central axis for fluidly connecting the core air flow path and the airfoil leading edge cavity, the first channel and the second channel arranged with one another such that the first central axis and the second central axis are oriented parallel with one another.

In addition to one or more of the features described above, or as an alternative to any of the foregoing embodiments, the vane forward rail defines a first inlet and a first channel for fluidly connecting a core air flow path and the outer diameter platform cavity, the vane forward rail further defining a second inlet and a second channel for fluidly connecting the core air flow path and the airfoil leading edge cavity, the first inlet and the second inlet being defined between a pair of seal features on an outer surface of the vane forward rail.

In addition to one or more of the features described above, or as an alternative to any of the foregoing embodiments, the airfoil and the root portion are arranged with one another to define a turbine vane.

In addition to one or more of the features described above, or as an alternative to any of the foregoing embodiments, the airfoil and the root portion are arranged with one another to define a second stage turbine vane.

In addition to one or more of the features described above, or as an alternative to any of the foregoing embodiments, the vane forward rail has a forward portion and an aft portion including the platform, the extension comprising a first extension and a second extension, the first extension defining the outer diameter platform cavity and the second extension defining the airfoil leading edge cavity, the first extension extending from the platform such that the outer diameter platform cavity defines a first length between an upper surface of the outer diameter platform cavity and a platform surface and the second extension extending from the platform such that the airfoil leading edge cavity defines a second length substantially equal to the first length.

In addition to one or more of the features described above, or as an alternative to any of the foregoing embodiments, the outer diameter platform cavity and the airfoil leading edge cavity being arranged with one another such that each of a pair of inlets to the cavities are spaced equidistant from the central axis.

In addition to one or more of the features described above, or as an alternative to any of the foregoing embodiments, the vane having a pair of seal features located on an outer surface of the vane forward rail, the vane forward rail defining a first inlet open to the outer diameter platform cavity and a second inlet open to the airfoil leading edge cavity, the first inlet and the second inlet being disposed between the pair of seal features.

In addition to one or more of the features described above, or as an alternative to any of the foregoing embodiments, the vane forward rail defines a first inlet open to the outer diameter platform cavity and a second inlet open to the airfoil leading edge cavity, the first inlet and the second inlet being arranged to transfer air flow from a core air flow path to a respective cavity.

In addition to one or more of the features described above, or as an alternative to any of the foregoing embodiments, the vane forward rail defines a first inlet open to the outer diameter platform cavity and a second inlet open to the airfoil leading edge cavity, the first inlet and the second inlet being defined on a same surface of the vane forward rail.

In addition to one or more of the features described above, or as an alternative to any of the foregoing embodiments, the first extension and the second extension each partially define a shared wall between the outer diameter platform cavity and the airfoil leading edge cavity.

Also disclosed is a gas turbine engine. The gas turbine engine having: a housing; an engine component disposed within the housing; a combustor in fluid communication with the engine component; and the engine component including: a platform having a vane forward rail defining a first channel with a first inlet open to the first channel, and defining a second channel with a second inlet open to the second channel; a first extension extending from the platform and defining a portion of an outer diameter platform cavity open to the first channel; a second extension extending from the platform and defining a portion of an airfoil leading edge cavity open to the second channel; and a first seal feature and a second seal feature each mounted to an outer surface of the vane forward rail and arranged with the first extension and the second extension such that each of the first inlet and the second inlet are defined between the first seal feature and the second seal feature.

In addition to one or more of the features described above, or as an alternative to any of the foregoing embodiments, the first channel fluidly connects a core air flow path and the outer diameter platform cavity and the second channel fluidly connects the core air flow path and the airfoil leading edge cavity.

In addition to one or more of the features described above, or as an alternative to any of the foregoing embodiments, the engine component is one of a compressor or a turbine.

In addition to one or more of the features described above, or as an alternative to any of the foregoing embodiments, the first extension and the second extension share a wall with one another such that each of the outer diameter platform cavity and the airfoil leading edge cavity are partially defined by the wall.

In addition to one or more of the features described above, or as an alternative to any of the foregoing embodiments, the first extension defines a first length between a platform outer surface and a first extension outer surface, and the second extension defines a second length from the platform outer surface to a second extension outer surface, the first length and the second length being substantially equal to one another.

Also disclosed is a method of forming a vane for a gas turbine engine, the method including the steps of: forming an outer diameter platform cavity and an airfoil leading edge cavity in an extension extending from a platform of a vane forward rail such that the cavities are oriented substantially parallel with one another; forming a first channel defining a first axis and fluidly connecting a core air flow path to the outer diameter platform cavity; and forming a second channel defining a second axis fluidly connecting the core air flow path to the airfoil leading edge cavity, the first channel and the second channel being formed such that the first axis is parallel to the second axis.

BRIEF DESCRIPTION OF THE DRAWINGS

The following descriptions should not be considered limiting in any way. With reference to the accompanying drawings, like elements are numbered alike:

FIG. 2A is a perspective aft view, in partial cross-section, of a portion of a gas turbine engine assembly;

FIG. 2B is a front view of the portion of the gas turbine engine assembly of FIG. 2A;

FIG. 4A is a perspective aft view, in partial cross-section, of a portion of an example of a vane rail of the gas turbine engine assembly of FIGS. 3A and 3B;

FIG. 4B is a front view of the portion of the vane rail of FIG. 4A; and

DETAILED DESCRIPTION

A detailed description of one or more embodiments of the disclosed apparatus and method are presented herein by way of exemplification and not limitation with reference to the Figures.

Figure 1:
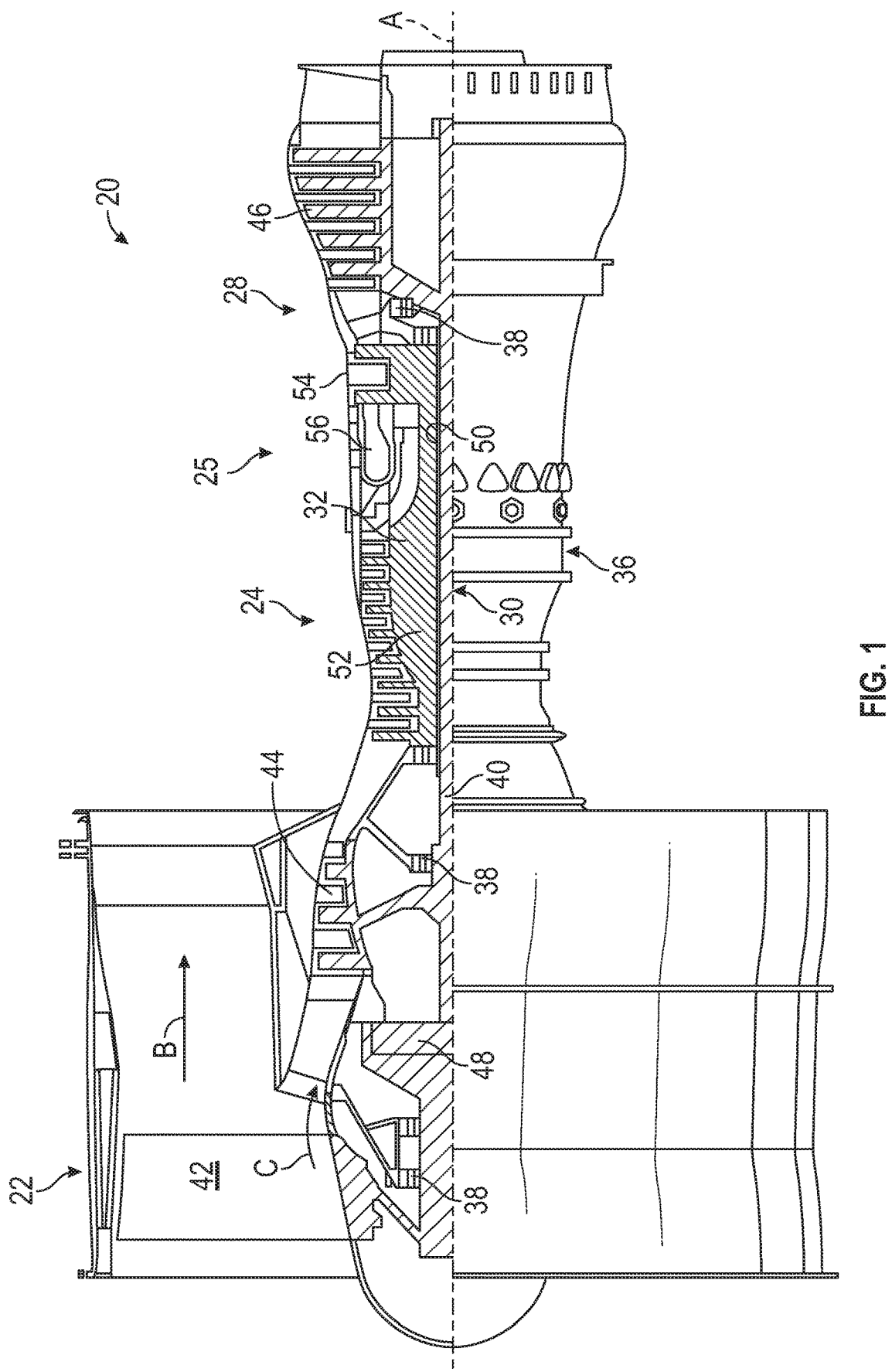
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The gas turbine engine 20 generally includes a low speed spool 30 and a high speed spool 32, each spool mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in the gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine 20 between the high pressure compressor 52 and the high pressure turbine 54. The engine static structure 36 supports the bearing systems 38 in the turbine section 28. The inner shaft 40 and the outer shaft 50 are concentric and rotate via the bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350.5 m/sec).

FIGS. 2A and 2B illustrate an example of portions of a gas turbine engine assembly, referred to generally as a vane forward rail assembly 70 herein. The vane forward rail assembly 70 includes a vane forward rail 72. The vane forward rail 72 may be located within a compressor section or a turbine section such as the compressor section 24 or the turbine section 28 described above. The vane forward rail 72 may operate to position and constrain the vane forward rail assembly 70 in an engine static structure, such as the engine static structure 36 shown in FIG. 1. The vane forward rail 72 includes a first extension 74 and a second extension 76. Each of the first extension 74 and the second extension 76 extends from a surface of a platform 78. The first extension 74 extends from the surface of the platform 78 to define a first length 80 and the second extension 76 extends from the surface of the platform 78 to define a second length 82. In this example, the first length 80 and the second length 82 are not of lengths substantially equal to one another. Each of a pair of plates (not shown) may be mounted to one of an upper surface of the first extension 74 and an upper surface of the second extension 76 to close off a respective cavity defined therein.

The first extension 74 includes a portion of an outer diameter platform cavity 84 and the second extension 76 includes a portion of an airfoil leading edge cavity 86. It is to be understood that the term "outer diameter platform cavity" as used herein refers to a platform cavity located further away from an engine central longitudinal axis, such as the engine central longitudinal axis A, in comparison to an inner diameter platform cavity. The outer diameter platform cavity 84 and the airfoil leading edge cavity 86 are arranged within the vane forward rail 72 to assist in routing cooling air, as represented by arrow 87, from a location forward of the vane forward rail 72 into the outer diameter platform cavity 84 and the airfoil leading edge cavity 86. In this example, the outer diameter platform cavity 84 and the airfoil leading edge cavity 86 are in fluid communication with one another.

FIG. 2B illustrates further detail of an outer surface 89 of the vane forward rail 72. The vane forward rail 72 defines a first inlet 92 and a second inlet 94. The first inlet 92 is open to the outer diameter platform cavity 84 and the second inlet 94 is open to the airfoil leading edge cavity 86. Each of the inlets is open to a respective cavity and allows cooling air, for example, the cooling air represented by arrow 87, to flow into a respective cavity. The cooling air resides radially between an outer seal surface 91 and an inner seal surface 95. The outer diameter platform cavity 84 cannot be fed from an inlet located on the outer surface 89 of the vane forward rail 72 in this example, similar to the second inlet 94, due to a location of an upper portion of the outer diameter platform cavity 84 being located radially inboard of the inner seal surface 95 and therefore not in the region of the cooling air residing radially between the outer seal surface 91 and the inner seal surface 95. A tab 96 is located between the outer seal surface 91 and the inner seal surface 95.

To provide cooling air to the outer diameter platform cavity 84, a channel 89 is drilled from a surface 97 through the outer diameter platform cavity 84 and into the airfoil leading edge cavity 86 allowing for fluid communication between the airfoil leading edge cavity 86 and the outer diameter platform cavity 84. The opening 92 in the surface 97 created as a result of drilling channel 89 must be closed off to prevent cooling air from exiting the vane forward rail assembly 70 through opening 92. If the operations of drilling of channel 89 and the subsequent closing off of opening 92 were removed, a cost benefit and manufacturing time reduction could be realized.

Figure 3A:
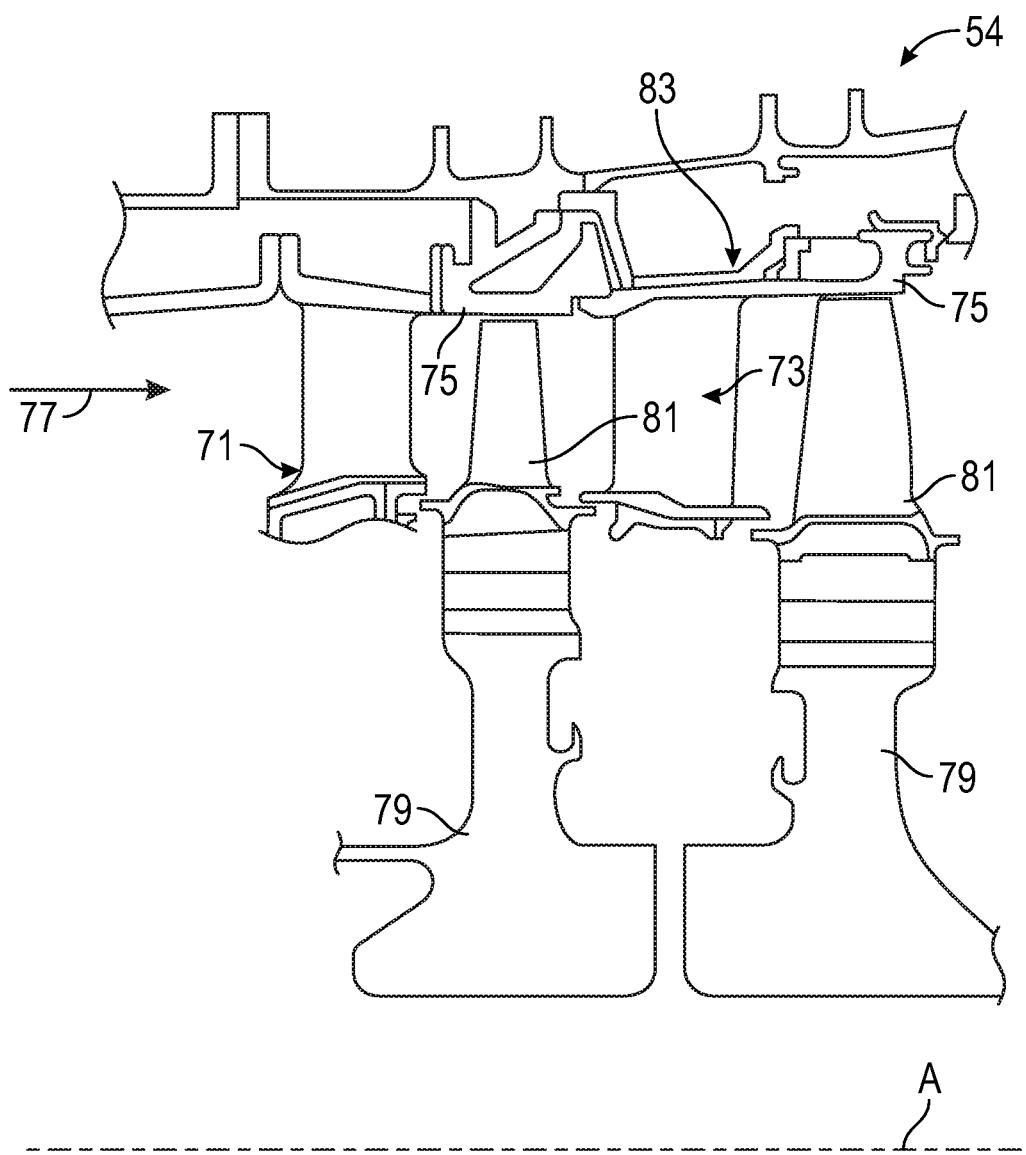
FIG. 3A is a schematic view of an example of a portion of a two-stage high pressure turbine of a gas turbine engine assembly.

FIG. 3A illustrates an example of a portion of the high pressure turbine 54. The high pressure turbine 54 includes a first stage vane 71 and a second stage vane 73. The first stage vane 71 is located forward of a first one of a pair of turbine disks 79 each having a plurality of turbine blades 81 secured thereto. The turbine blades 81 rotate proximate to blade outer air seals 75 which are located aft of the first stage vane 71. The second stage vane 73 is located between the pair of turbine disks 79.

The first stage vane 71 is the first vane of the high pressure turbine section 54 that is located aft of the combustor section 26. The second stage vane 73 is located aft of the first stage vane 71 between the pair of turbine disks 79. The second stage vane 73 and the first stage vane 71 are located circumferentially about the engine central longitudinal axis A to provide a stator assembly 83. Hot gases from the combustor section 26 flow through the turbine in a direction of arrow 77. Although a two-stage high pressure turbine is illustrated, other high pressure turbines are considered to be within the scope of various embodiments of the present disclosure.

Figure 3B:
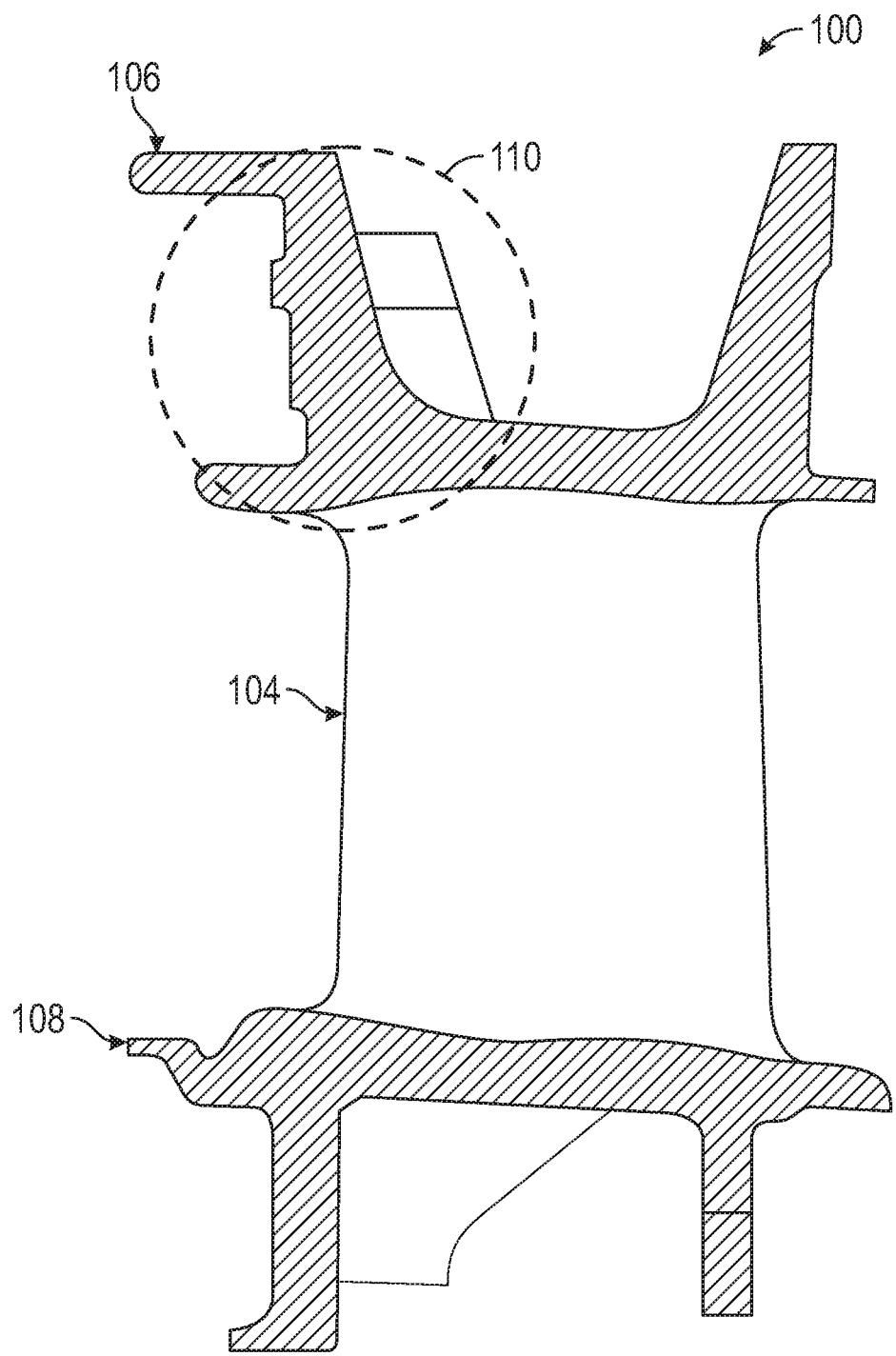
FIG. 3B is a side view of a portion of a gas turbine engine vane.

FIG. 3B is a side view of a portion of an example of a gas turbine engine vane, referred to generally as a vane 100 herein. The vane 100 may include an airfoil portion 104 disposed between a first root portion 106 and a second root portion 108. The vane 100 may include a vane forward rail. In one example, the vane forward rail may be located within a region 110 of the first root portion 106. The vane 100 may be located within a compressor section or a turbine section such as the compressor section 24 or the turbine section 28 described above. The airfoil portion 104 and one of the first root portion 106 or the second root portion 108 may be arranged with one another to define a turbine vane, such as a second stage turbine vane.

FIGS. 4A and 4B illustrate an example of a portion of a gas turbine engine assembly according to an embodiment of the present disclosure, referred to generally as a vane assembly 200 herein. The vane assembly 200 may be located within a gas turbine engine within a compressor section or a turbine section such as the compressor section 24 or the turbine section 28 described above. The vane assembly 200 may be disposed within a housing. The engine static structure 36 described above may also be referred to as a housing herein. The engine central longitudinal axis A may be defined by the engine static structure 36.

The vane assembly 200 may include a vane forward rail 206. The vane forward rail 206 may be located within a root portion of a vane assembly, such as the first root portion 106 described above. The vane forward rail 206 may operate to position and constrain the vane assembly 200 in an engine static structure, such as the engine static structure 36 described above. The vane assembly 200 may include one or more structures to assist in managing thermal conditions thereof.

For example, the vane forward rail 206 may include a first extension 208 and a second extension 210. Each of the first extension 208 and the second extension 210 may extend from a surface 216 of a vane platform 218. It is contemplated that the first extension 208 and the second extension 210 may be formed as a single extension. The first extension 208 may include a portion of an outer diameter platform cavity 230 and the second extension 210 may include a portion of an airfoil leading edge cavity 232. Terms "inner," "radially inward," "outer," and "radially outward" as used herein operate as adjectives to describe a position of an object relative to an engine central longitudinal axis, such as the engine central longitudinal axis A described above. For example, an object described herein as "radially inward" is located closer to an engine central longitudinal axis in comparison to an object described herein as "radially outward."

A distance between an upper surface of the outer diameter platform cavity 230 and the surface 216 of the vane platform 218 may define a first length 224. A distance between an upper surface of the airfoil leading edge cavity 232 and the platform surface 216 may define a second length 226. In this example, a length of the first length 224 may be substantially equal to a length of the second length 226.

The first extension 208 and the second extension 210 may be arranged with one another such that an upper portion or edge of each of the outer diameter platform cavity 230 and the airfoil leading edge cavity 232 is spaced equidistant from the platform surface 216, the vane platform 218, and a central axis further described below. The outer diameter platform cavity 230 may define a first axis and the airfoil leading edge cavity 232 may define a second axis. The outer diameter platform cavity 230 and the airfoil leading edge cavity 232 may be arranged with one another such that the first axis and the second axis are oriented substantially parallel to one another. The first extension 208 and the second extension 210 may each further define a shared wall 233 between the outer diameter platform cavity 230 and the airfoil leading edge cavity 232.

A plate (not shown) may be mounted to a surface of the first extension 208 and a surface of the second extension 210 to close off the outer diameter platform cavity 230 and the airfoil leading edge cavity 232. The outer diameter platform cavity 230 and the airfoil leading edge cavity 232 are arranged within the vane forward rail 206 to assist in routing cooling air, as represented by arrows 235, from a location forward of the forward rail 206 into the outer diameter platform cavity 230 and airfoil leading edge cavity 232 to assist in managing thermal conditions thereof. In one example, the cooling air may flow from a flow path of a gas turbine engine, such as the core flow path C described above.

FIG. 4B illustrates further detail of an outer surface 249 of the vane forward rail 206. The vane forward rail 206 may define a central longitudinal axis, such as a central axis 250. The central axis 250 may be an axis similar to an engine central axis, such as the engine central longitudinal axis A described above. The vane forward rail 206 may define a first inlet 254 and a second inlet 256. The first inlet 254 may be open to the airfoil leading edge cavity 232 via a first channel 260 (shown in FIG. 4A) and the second inlet 256 may be open to the outer diameter platform cavity 230 via a second channel 262 (shown in FIG. 4A). Each of the first channel 260 and the second channel 262 may define an axis. The first channel 260 and the second channel 262 may be arranged with one another such that the axes are oriented parallel to one another.

Air to assist in managing thermal conditions of the vane forward rail 206 may be accessibly located forward of the vane forward rail 206. For example, the air may reside radially between an outer seal surface 270 and an inner seal surface 272. A tab 266 may be disposed between the outer seal surface 270 and the inner seal surface 272. The air may be, for example, air from a flow path such as the core flow path C described in relation to FIG. 1. Each of the first inlet 254 and the second inlet 256 may be located between the outer seal surface 270 and the inner seal surface 272.

The first inlet 254 and the second inlet 256 may be in fluid communication with an air flow path, such as the air flow path represented by arrows 235, to assist in transferring air flow to the outer diameter platform cavity 230 and the leading edge cavity 232. The first inlet 254 and the second inlet 256 may be arranged with one another such that central axes of each of the first channel 260 and the second channel 262 are oriented parallel with one another. This parallel relationship assists in manufacturing the vane assembly 200 in that a single tool may include two drill bits oriented in parallel to one another instead of requiring two drill bits on non-parallel axes as needed to drill the channels described in relation to the vane forward rail 72 described above.

The outer diameter platform cavity 230 and the airfoil leading edge cavity 232 may each be in separate fluid communication with the air flow path represented by the arrows 235. The outer diameter platform cavity 230 and the leading edge cavity 232 are not in fluid communication with one another in contrast to the cavities of the vane forward rail 72 described above.

The outer diameter platform cavity 230 and the airfoil leading edge cavity 232 may be arranged with one another such that an upper edge of each cavity is spaced equidistant from the vane platform 218 and the central axis 250. Each of the first extension 208 and the second extension 210 may extend from the vane platform 218. The outer diameter platform cavity 230 and the airfoil leading edge cavity 232 may be further arranged with one another such that each of the first inlet 254 and the second inlet 256 are defined at a location equidistant from a central axis defined by an engine housing, such as the engine static structure 36 described in relation to FIG. 1. For example, each of the first inlet 254 and the second inlet 256 may be spaced equidistant from the central axis 250.

Figure 5:
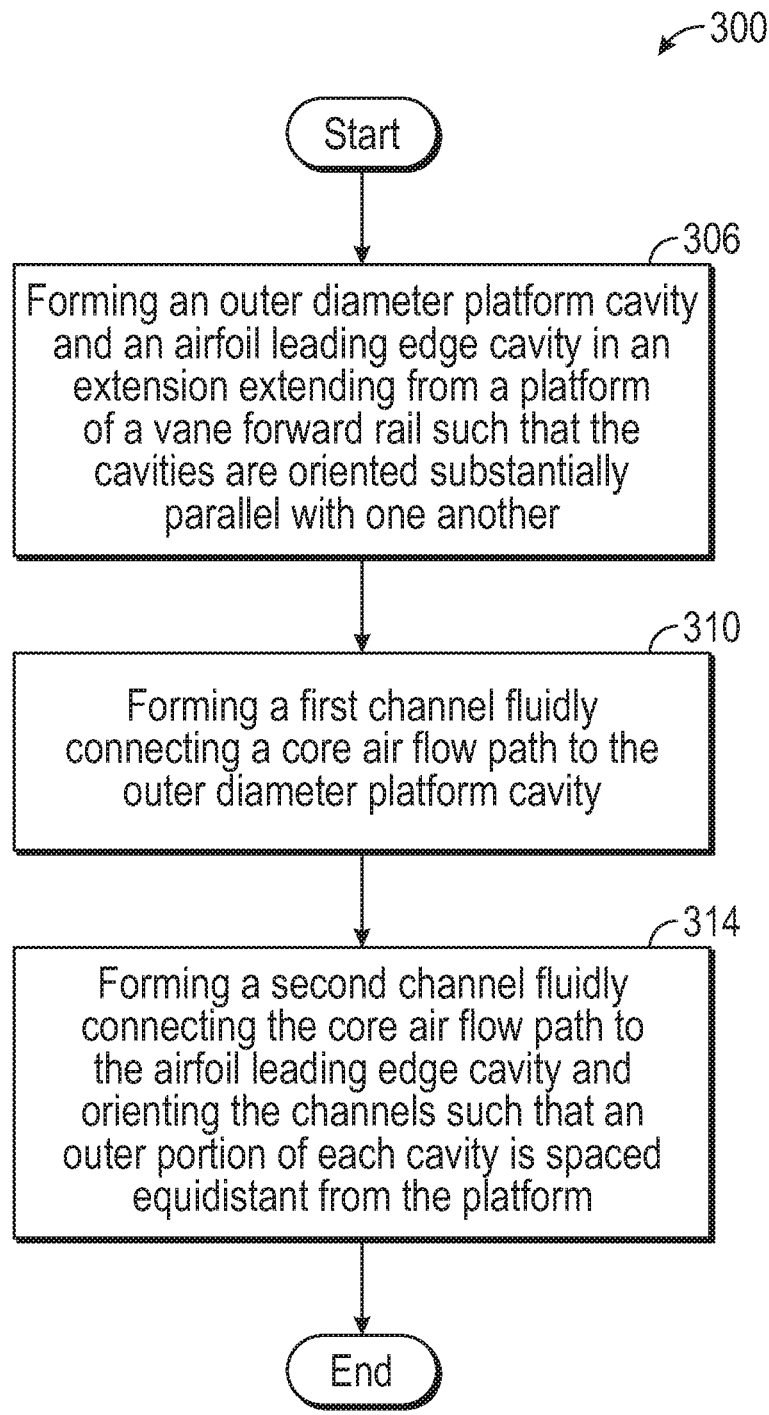
FIG. 5 is a flow chart illustrating an example of a method of forming a vane assembly of a gas turbine engine assembly.

FIG. 5 illustrates an example of a method of forming a vane of a gas turbine engine assembly, referred to generally as a method 300 herein. In operation 306, an outer diameter platform cavity and an airfoil leading edge cavity may be formed in an extension of a vane forward rail such that each of the cavities are oriented parallel with one another. The extension may extend from a platform and may be joined to the vane forward rail. It is contemplated that the extension may be formed with two separate extensions, each of the two separate extensions defining one of portions of the outer diameter platform cavity and the airfoil leading edge cavity.

In operation 310, a first channel may be formed to fluidly connect a derivative of a core air flow path, such as the core flow path C described in relation to FIG. 1, to the outer diameter platform cavity. In operation 314, a second channel may be formed to fluidly connect another derivative of the core air flow path to the airfoil leading edge cavity. The forming of the second channel may be performed before, simultaneous to, or after the forming of the first channel. The first channel and the second channel may be oriented such that an outer portion of each of the cavities is spaced equidistant from the platform.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but does not preclude the presence or addition of one or more other features, integers, steps, operations, element components, and/or groups thereof.

While the present disclosure has been described with reference to an example embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vane for a gas turbine engine, the vane comprising:
   an airfoil; and
   a root portion disposed on a side of the airfoil and including a platform, the platform having a vane forward rail and an extension extending from the platform, the extension defining portions of an outer diameter platform cavity and an airfoil leading edge cavity, wherein the extension extends from the platform such that an upper portion of each of the outer diameter platform cavity and the airfoil leading edge cavity is spaced equidistant from the platform, and wherein the vane forward rail further defines a first inlet and a second inlet and a first channel extends from the first inlet to the outer diameter platform cavity, and a second channel extends from the second inlet to the airfoil leading edge cavity.

2. The vane of claim 1, wherein the first inlet and the second inlet are equidistant from a central axis.

3. The vane of claim 1, wherein the extension further defines a central wall disposed between the outer diameter platform cavity and the airfoil leading edge cavity.

4. The vane of claim 1, wherein the first channel has a first central axis and the second channel has a second central axis, the first channel and the second channel being arranged with one another such that the first central axis and the second central axis are oriented parallel with one another.

5. The vane of claim 1, wherein the first inlet and the second inlet are located between a pair of seal surfaces on an outer surface of the vane forward rail.

6. The vane of claim 1, wherein the airfoil and the root portion are arranged with one another to define a turbine vane.

7. The vane of claim 1, wherein the airfoil and the root portion are arranged with one another to define a second stage turbine vane.

8. The vane of claim 1, wherein the vane forward rail further has a forward portion and an aft portion including the platform, the extension comprising a first extension and a second extension, the first extension defining the outer diameter platform cavity and the second extension defining the airfoil leading edge cavity, the first extension extending from the platform such that the outer diameter platform cavity defines a first length between an upper surface of the outer diameter platform cavity and a platform surface and the second extension extending from the platform such that the airfoil leading edge cavity defines a second length substantially equal to the first length.

9. The vane of claim 8 wherein the outer diameter platform cavity and the airfoil leading edge cavity are arranged with one another such that the first inlet and the second inlet are spaced equidistant from a central axis.

10. The vane of claim 8 further comprising a pair of seal surfaces located on an outer surface of the vane forward rail, the first inlet and the second inlet being disposed between the pair of seal surfaces.

11. The vane of claim 8, wherein first inlet and the second inlet are arranged to transfer air flow from a core air flow path to the outer diameter platform cavity and the airfoil leading edge cavity.

12. The vane of claim 8, wherein the first inlet and the second inlet are defined on a same surface of the vane forward rail.

13. The vane of claim 8, wherein the first extension and the second extension each partially define a shared wall between the outer diameter platform cavity and the airfoil leading edge cavity.

14. A gas turbine engine comprising:
   a housing;
   an engine component disposed within the housing;
   a combustor in fluid communication with the engine component, the engine component including:
      a platform having a vane forward rail defining a first channel with a first inlet open to the first channel, and defining a second channel with a second inlet open to the second channel,
      a first extension extending from the platform and defining a portion of an outer diameter platform cavity open to the first channel, a second extension extending from the platform and defining a portion of an airfoil leading edge cavity open to the second channel, and a first seal surface and a second seal surface located on an outer surface of the vane forward rail and arranged with the first extension and the second extension such that each of the first inlet and the second inlet are defined between the first seal surface and the second seal surface.

15. The gas turbine engine of claim 14, wherein the first channel fluidly connects a core air flow path and the outer diameter platform cavity and the second channel fluidly connects the core air flow path and the airfoil leading edge cavity.

16. The gas turbine engine of claim 14, wherein the engine component is one of a compressor or a turbine.

17. The gas turbine engine of claim 14, wherein the first extension and the second extension share a wall with one another such that each of the outer diameter platform cavity and the airfoil leading edge cavity are partially defined by the wall.

18. The gas turbine engine of claim 14, wherein the first extension defines a first length between a platform outer surface and a first extension outer surface, and the second extension defines a second length from the platform outer surface to a second extension outer surface, the first length and the second length being substantially equal to one another.

19. A method of forming a vane for a gas turbine engine comprising:

forming an outer diameter platform cavity and an airfoil leading edge cavity in an extension extending from a platform of a vane forward rail such that the outer diameter platform cavity and the airfoil leading edge cavity are oriented substantially parallel with one another;

forming a first channel defining a first axis and fluidly connecting a core air flow path to the outer diameter platform cavity; and forming a second channel defining a second axis fluidly connecting the core air flow path to the airfoil leading edge cavity, the first channel and the second channel being formed such that the first axis is parallel to the second axis, wherein the vane forward rail further defines a first inlet and a second inlet and the first channel extends from the first inlet to the outer diameter platform cavity, and the second channel extends from the second inlet to the airfoil leading edge cavity.

* * * * *